United States Patent [19]

Andersson

[11] Patent Number: 4,503,973
[45] Date of Patent: Mar. 12, 1985

[54] TRANSPORT BOX

[76] Inventor: Håkan Andersson, Kvarnliden 4, Skara, Sweden, 532 00

[21] Appl. No.: 577,618
[22] PCT Filed: May 26, 1982
[86] PCT No.: PCT/SE83/00212
§ 371 Date: Jan. 25, 1984
§ 102(e) Date: Jan. 25, 1984
[87] PCT Pub. No.: WO83/04238
PCT Pub. Date: Dec. 8, 1983

[30] Foreign Application Priority Data

May 26, 1982 [SE] Sweden .............................. 8203258

[51] Int. Cl.³ .................... B65D 19/06; B65D 19/20
[52] U.S. Cl. ................................ 206/386; 206/600; 217/43 A; 229/23 A
[58] Field of Search ........ 206/380, 600, 320, 397–399; 217/43 A, 23 A; 229/23 C, 23 R

[56] References Cited

U.S. PATENT DOCUMENTS

| | | | |
|---|---|---|---|
| 3,831,744 | 8/1974 | Walden et al. | 206/600 |
| 3,949,929 | 4/1976 | Kupersmit | 206/600 |
| 4,009,787 | 3/1977 | Beal | 206/600 |
| 4,331,234 | 5/1982 | Gilbert | 206/600 |
| 4,383,609 | 5/1983 | Lochmiller | 206/600 |
| 4,441,649 | 4/1984 | Nederveld | 206/386 |

Primary Examiner—Joseph Man-Fu Moy
Attorney, Agent, or Firm—Holman & Stern

[57] ABSTRACT

A transport box corrugated cardboard or the like, said box when erected being connectable to a load carrying plane, a pallet, a roller pallet or the like, at which the loading receive locking lugs (26) projectable or foldable from the bottom (21, 22) of the transport box (11) and arranged to connect the box to the loading plane. The object of the present invention is to provide a transport box of a cheap material, e.g. corrugated cardboard which after use can be folded to a very narrow package and either be sent to a recovery paper collection or be reused one or more times. The transport box should very easily be connected to a load-carrying plane in such a way that the box withstands transport and driving over rough floors and said loading plane at the return transport from the retail trade to the packing central requiring only a small part of the space required by the transport box per se. These objects have been achieved by the fact that the loading plane (12) is provided with connection means (15) designed to receive locking lugs (26) projectable or foldable from the bottom (21, 22) or lower part of the transport box (11), said locking lugs being arranged to connect the box to the loading plane.

9 Claims, 11 Drawing Figures

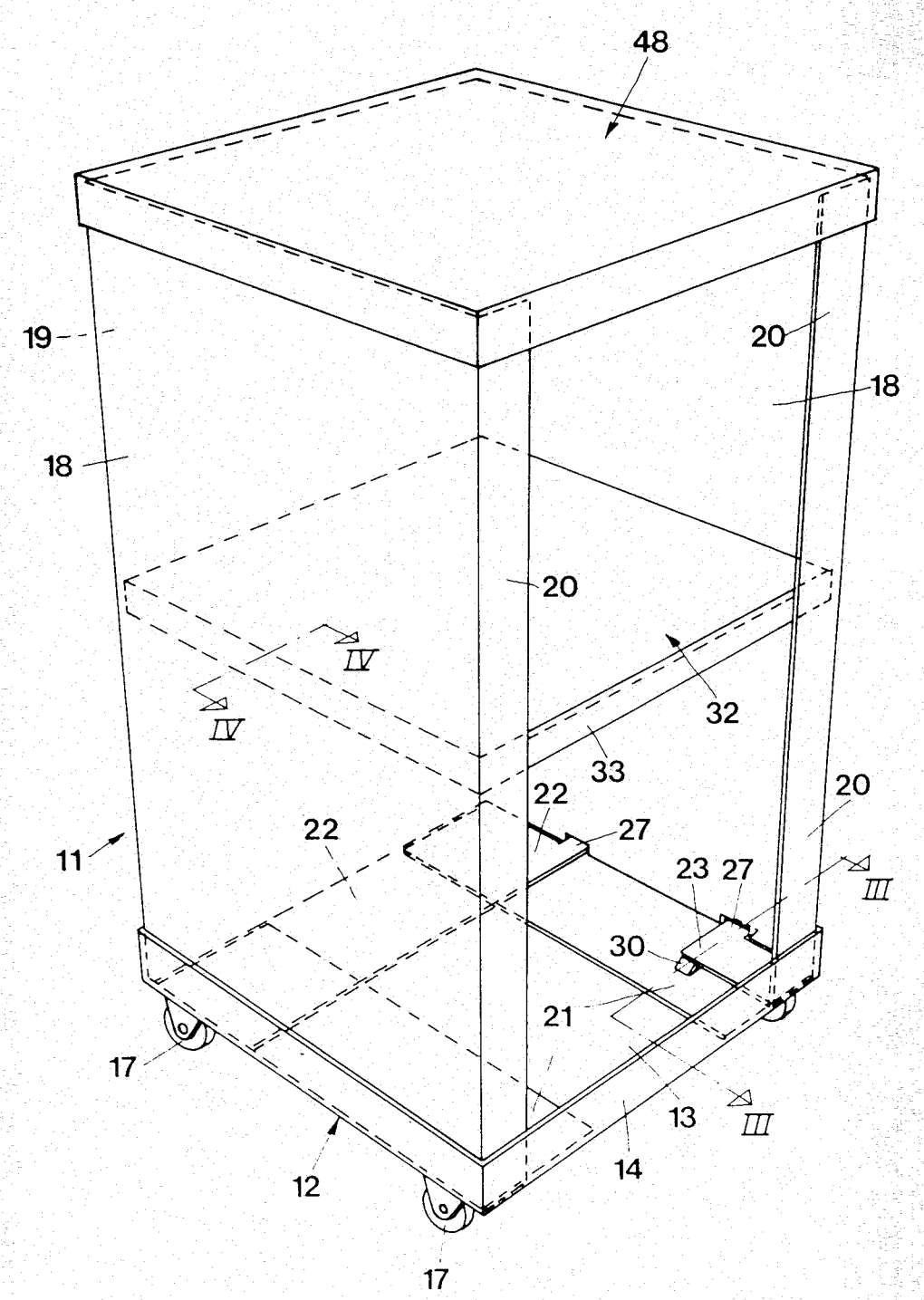

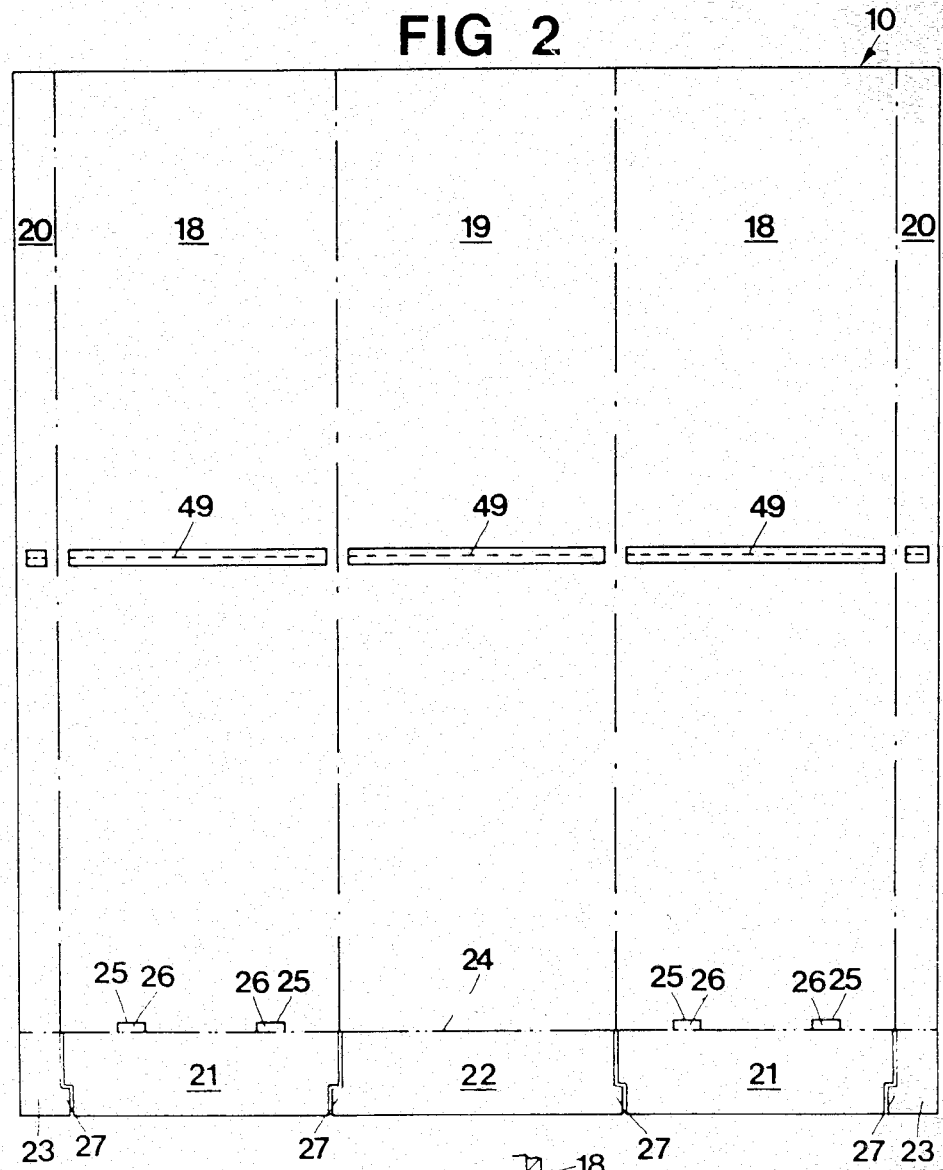

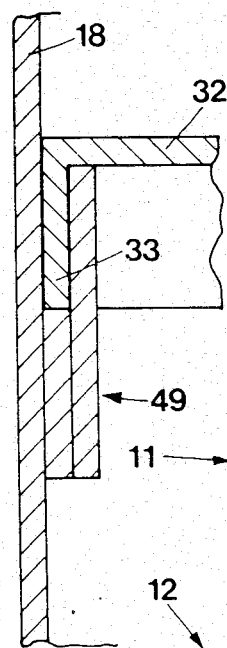
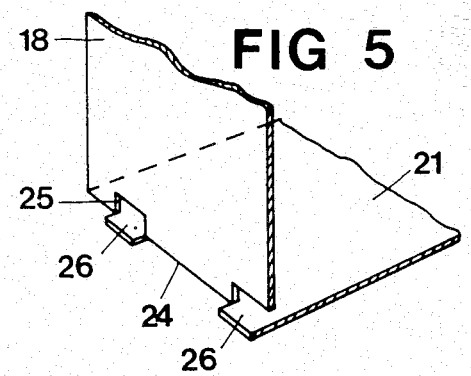
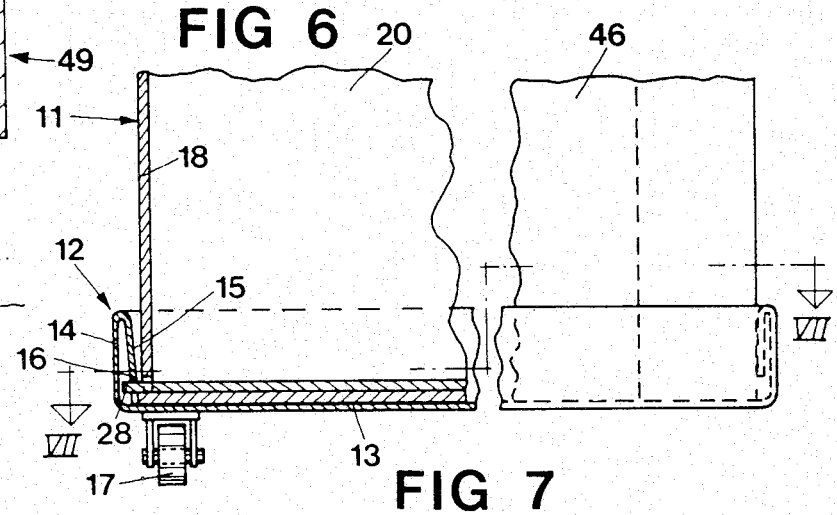
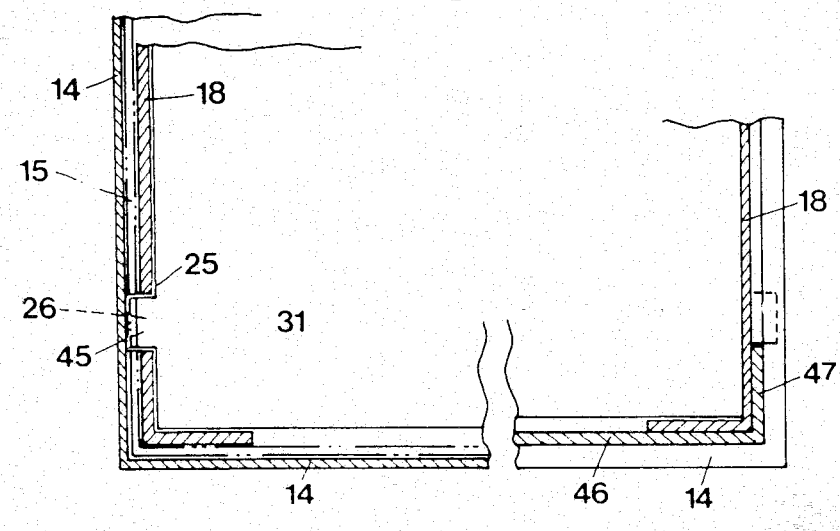

FIG 8
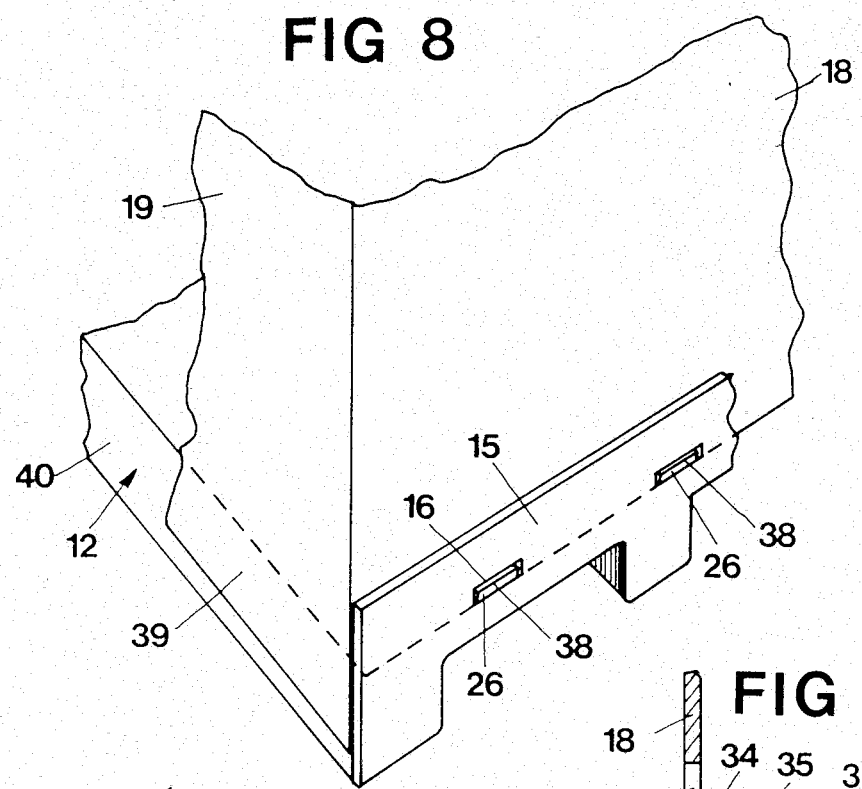
FIG 9
FIG 10
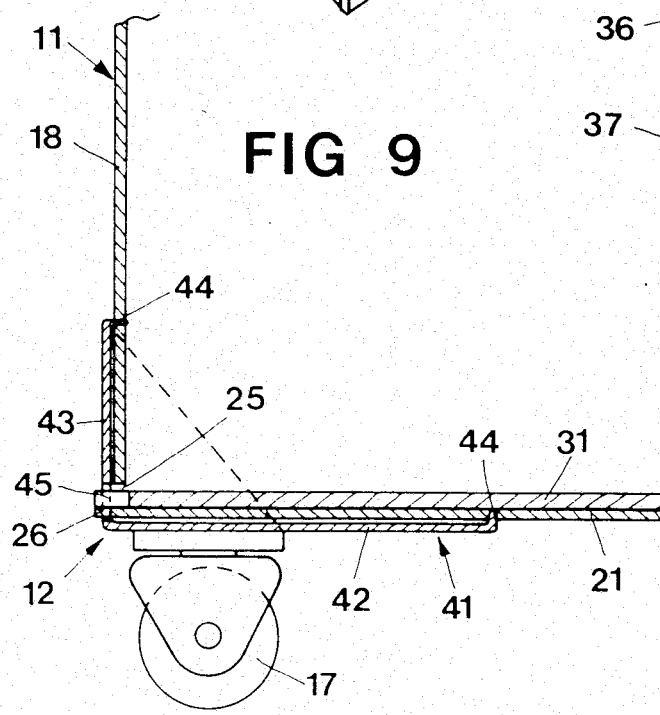

4,503,973

TRANSPORT BOX

CROSS REFERENCE TO RELATED APPLICATION(S)

This U.S. application stems from PCT International Application No. PCT/SE83/00212 filed May 26, 1983.

The present invention refers to a transport box of corrugated cardboard or the like, said box when erected being connectable with a load carrying plane, e.g. a pallet, a roller pallet or the like, at which the loading plane is provided with connection means designed to receive locking lugs projectable or foldable from the bottom or lower part of the transport box, said locking lugs being arranged to connect the box to the loading plane.

BACKGROUND OF THE INVENTION

Transport of perishables such as eggs, from the packing central to the retail trade is to a great extent taking place in special manufactured carriages comprising a stable tubular steel framework fitting into the special refrigerators of the market. For not making it necessary to repack the transport carriages these are designed with a removable front side, so that the content of the entire carriage can be reached from the front.

These carriages are however expensive to manufacture and are bulky during the return transport as well as in the market and in the storage spaces. Since these carriages very seldom can be used for other purposes the return transport represents a considerably part of the costs.

Considering the very limited spaces in the markets it is important that the transport from the truck to the refrigerator can take place on wheel-provided transport means, so that no lifting of the relatively heavy load has to be made.

It is further known a transport box of corrugated cardboard or the like (Swiss patent No. 523 845), in the bottom of which foldable locking lugs have been arranged which can be brought to cooperate with gaps between the boards in a pallet or the like. Such a transport box with this type of locking lugs is relatively effectively fixed against displacement of the box in the plane of the pallet, but the transport box can not withstand lateral forces which attack at the upper part of the transport box and which exert tensile strains on the bottom of the box. Such lateral forces occur if the box is transported e.g. on a roller pallet and pushing forces are applied against the corrugated cardboard box. When loading and unloading such roller pallets from a truck by way of an inclined approach the transport box if exerted even to tractive forces, and it is completely inconcievable to exert the transport box according to the Swiss patent to such forces without the locking lugs leaving the gaps in the pallet.

It is also known a box of corrugated cardboard with lugs stamped out in the bottom flaps (Swedish printed publication No. 408.844), said lugs being folded about exposed boards of the pallet and are inserted into recesses at the base of the box. With this kind of connection a relatively good connection between the corrugated cardboard box and the pallet is achieved but the erection of the box to the pallet is very difficult. The erection implies that the box is placed upside-down with the bottom side upwards, that the pallet is placed on the top of the box and that the locking lugs are folded over and under the exposed boards of the pallet. After that the transport box shall together with the relatively heavy pallet be turned and during the turning thereof it can be difficult to avoid that the pallet is displaced in the longitudinal direction of the boards and that the locking lugs come loose.

According to a previously known transport box of plywood (French patent specification No. 2 412 466) each loose wall plate is in its lower edge provided with a fixed strip intended to be inserted under a raised edge at the pallet. The loose side walls are locked in its position applied on the pallet by means of lose corner connection members in the form of angle plates, which are hooked in recesses in the side walls. These constructional principle implies that the side walls are made of a rigid material and can not be applied at transport boxes of corrugated cardboard.

THE PURPOSE AND MOST IMPORTANT CHARACTERISTICS OF THE INVENTION

The object of the present invention is to provide a transport box of a cheap material, e.g. corrugated cardboard, which after use can be folded together to a very narrow package and either being sent to a recovery paper collection or being reused one or more times. The transport box should very eaisly be connectable to a load carrying plane in such a way that the box withstands handling without being moved from the loading plane and it has to withstand driving over rough floors and to be exerted to an ungentle treatment. Another object of the invention is to provide that the loading plane at the return transport from a retail trade to the packing central only takes a small part of the space required by the transport box per se. The load carrying planes can be piled on each other at which they are locked to each other through the wheels. These objects have been achieved by the fact that the locking lugs comprise U-shaped cuts arranged in connection to a folding line between the side walls and bottom flaps of the transport box, said cuts being arranged to form outside the sideboards projecting locking lugs in the plane of the flaps when these are folded to bear against the loading plane and said locking lugs being insertable under blocking surfaces arranged at the connection means.

DESCRIPTION OF THE DRAWINGS

FIG. 1 shows in perspective a transport box according to the invention with the front cover removed.

FIG. 2 is a plan view of the blank from which the box part according to the invention is manufactured.

FIG. 3 is a section according to the line III—III in FIG. 1.

FIG. 4 is a section according to the line IV—IV in FIG. 1.

FIG. 5 shows in perspective a part of the side wall and bottom flap.

FIG. 6 is a section through the lower portion of the box according to the invention.

FIG. 7 is a section according to the line VII—VII in FIG. 6.

FIG. 8 shows a modified embodiment of the transport box according to the invention.

FIG. 9 shows a section through the lower portion of a further embodiment.

FIG. 10 shows a section through the middle portion of the transport box with a modified device for supporting and connecting the shelf plane to the side walls.

DESCRIPTION OF EMBODIMENTS

Figure 11:
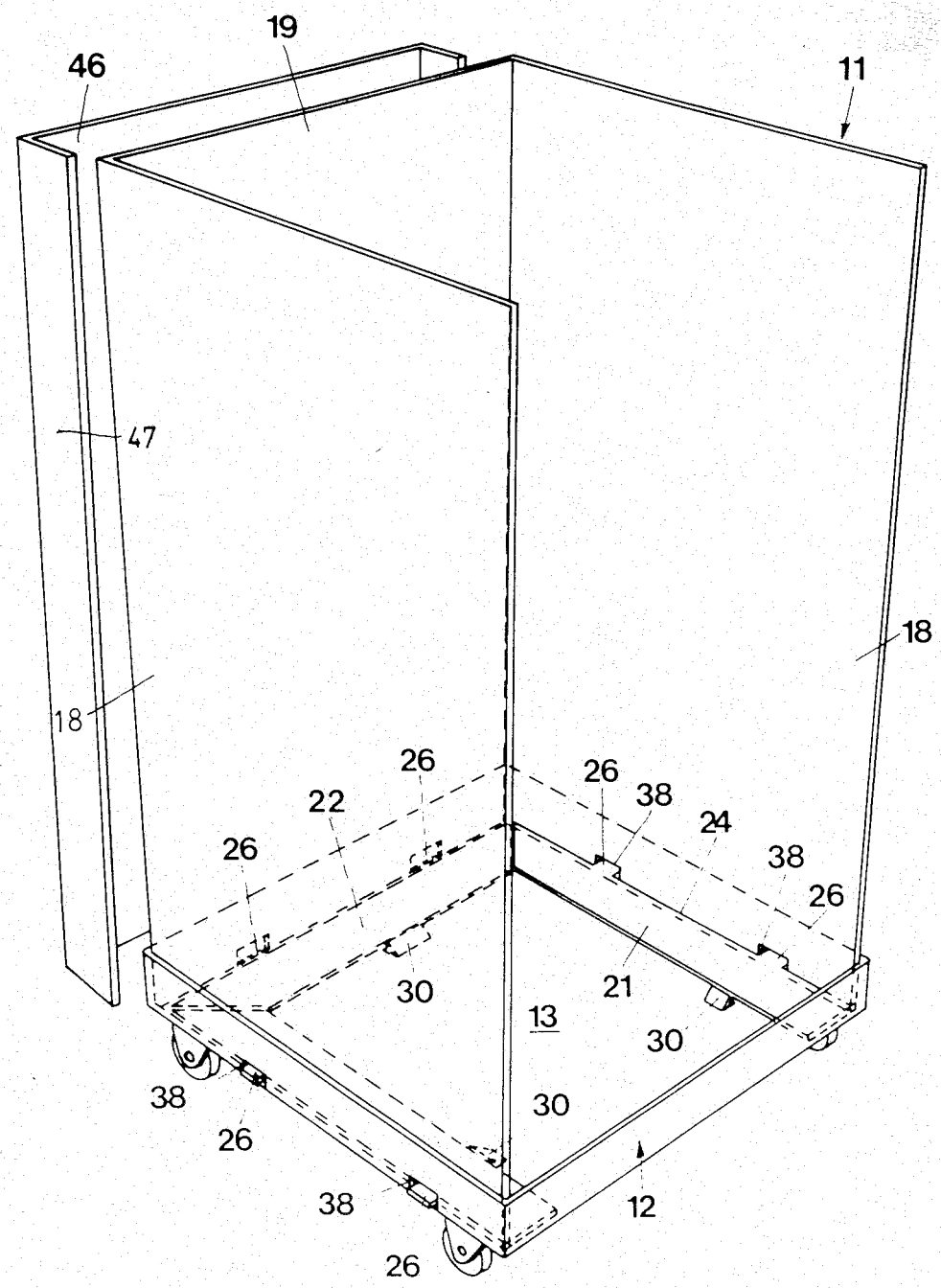
FIG. 11 shows in perspective a simplified embodiment of the transport box shown in FIG. 1.

The transport box according to the invention comprises a box portion 11 and a load carrying plane 12, henceforth called the loading plane. This can consist of a conventional pallet, a roller pallet or the like. In FIG. 1 is shown a roller pallet of a special design comprising a trough-like container with a bottom 13 and sidewalls 14, at which connection members 15 are arranged in the form of bent edge portion 15 extending from the upper edge of the sidewalls in towards the bottom of the trough. Its lower free end surface 16 is arranged at some distance above the bottom 13 as is shown in FIG. 3. The loading plane is further provided with four wheels 17.

The box portion 11 consists of a blank 10,—FIG. 2—which comprises two sidewalls 18, a rear wall 19 and narrow front walls portions 20, which leave a large portion of the front wall open so that the whole content of the transport box can be reached from the front.

At the lower portion of the box blank 10 there is connected a bottom flap 21 to each sidewall 18 and a corresponding bottom flap 22 to the rear wall 19. Bottom flaps 23 are also provided at the front wall portions 20. In connection to the folding line 24 between the sidewall 18 and the bottom flap 21 between the rear wall 19 and the bottom flap 22 and between the front wall portion 20 and the bottom flaps 23 there are arranged U-shaped cuts 25, through which a respective locking lug is formed at the folding of the bottom flap about the folding line 24, as can be seen in FIG. 5.

When erecting and mounting the box in the loading plane 12 the locking lugs 26 will be located under the downwards folded free end surface 16 of the edge portion 15 and which forms a blocking surface which prevents the box portion 11 from being drawn up from the loading plane 12. In order to prevent the bottom flaps 21, 22 and 23 from erecting it is appropriate to lock them in the direction towards the loading plane by means of suitable locking means, e.g. locking lugs 27, arranged at the end edges of the flaps 22 and 23 facing each other in such a way that when the flaps 22 and 23 are folded over the flaps 21 the locking lugs 27 are insertable into the cuts 25. For preventing the flaps 23 from slipping out of the cut 25 embossings, stampings or the like 28 are arranged in the bottom 13 of the loading plane, see FIG. 13, and which cooperate with cuts 29 located just opposite them which in an upwards folded position form a support edge 30.

Another way to lock the flaps 21, 22, 23 from erecting can be seen in FIGS. 6 and 7, where the locking means comprises a plate 31 of corrugated cardboard, which is provided with locking lugs 45 in the same way as the locking lugs 26 at the bottom flaps 21 and said locking lugs engaging under the edge portion 15.

Another way to lock the bottom flaps 21 to the bottom 13 of the loading plane 12 is by means of lips, not shown, attached thereto or embossed therefrom, under which an edge portion of the flaps can be placed.

The open front wall of the box portion 11 can be closed by means of a front wall 46 provided with folded longitudinal side edges 47, which in the mounted position of the front wall bears against the side walls 18 of the box portion 11, as is shown in the right portion in FIGS. 6 and 7. The front wall is locked to the box portion during transport by the lower portion of the front wall being inserted between the edge portion 15 and the box portion and in its upper portion is located by means of a cover 48.

Since transport boxes normally are relatively high, about 1.8 m, the box portion are stayed by means of at least one shelf plane 32, which also is load carrying during transport of e.g. damageable goods, and which is designed with a downwards folded edge 33 all around as is shown in FIGS. 1 and 10. The connection of the shelf plane 32 with the box portion 11 can be made in many different ways, but the connection has to be so designed that it on one hand can take up lateral forces besides the load on the shelf plane, but on the other hand be easily erectable and diserectable. A way of achieving this connection is by means of bars 49 attached at the side walls 18, the rear wall 19 and the narrow front wall portions 20, said bars comprising a narrow and a broad corrugated cardboard strip glued to each other and to the inside of said side walls. In the slotformed space formed between the side wall and the broader of the two strips the downward folded edge 33 of the shelf plane can be placed, at which the shelf plane 32 becomes load carrying at the same time as it can take up occuring lateral forces. Another way of providing this connection is by means of attachment means 34 shown in FIG. 10 and consisting of plastic or plate clips which are passed through an opening 35 in the shelf plane 32 adjacent the edge 33 and said clips can be hooked through recesses 36 and 37 in the side walls 18 of the box portion. Through this arrangement there is achieved a very effective locking of the shelf plane to the side walls but also a device with is easily erectable and diserectable.

In FIG. 8 there is shown a somewhat modified embodiment of the invention where the loading plane 12 consists of a pallet, which only on two side edges has been provided with connection means 15 in the form of side plates in which slots 38 are provided, the upper edges of which form said blocking surfaces 16. In the slots there can be inserted the locking lugs 26 of the bottom flaps 21 and possibly also the locking lugs 45 of the plate 31. Instead of the side plates 15 these can be designed as downward folded edge portions in the same way as was described in connection with FIG. 3. The side plate 15 can also consist of integrated portions with the pallet, at which the pallet preferably is manufactured by a plastic material.

If the pallet 12 only on two opposite sides is provided with connection means 15 the rear wall 19 of the box portion and the front wall portions 20 can preferably be provided with extended portions 39 which projects over the side edges 40 of the pallet.

A further modification of the invention is shown in FIG. 9, where the loading plane 12 consists of two separate parts 41, each comprising a bar 41 having a L-shaped cross section and which supports two wheels 17. The L-shaped bar is at the free ends of the shanks 42 and 43 provided with pins 44 or the like arranged perpendicular thereto and which can be pressed into the side walls 18 and the bottom flaps 21 of the corrugated cardboard of the box portion 11. The locking of the bottom flaps to the loading plane 12 is made in the way described above.

Through this arrangement of the loading plane in two similar parts the handling is further simplified at the same time as the return package i.e. the two loading plane portions requires even less space.

The upward, inwards and downwards folded edges of the load carrying plane make besides the locking function also a protection against bumps and lateral loads during store handling and transport by car or the like.

A hole in the bottom makes a drainage for possible liquid from the load carrying plane. The hole can be so large that some fingers or another object can be pushed in for pushing up the locking plate (corrugated cardboard) so that the locking lug of the plate is released from the sides of the loading plane.

At the embodiment shown in FIG. 11 the front wall portions 20 are eliminated, so that a completely open front side is provided at which also a mechanical packing of the transport box can be made without disturbing side flaps. The box portion 11 consisting of corrugated cardboard thus comprises only three side walls 18 and 19 and the bottom flaps 21 and 22 connected thereto, which have been provided with G-rings so that there are no overlapping portions which can steel space. The bottom flaps 21 and 22 are locked in mounted position against displacement in the bottom plane 13 of the load carrier 12 by support edges 30 embossed from the bottom. In the same way as in the previously described embodiments the box portion is in connection to the folding line 24 provided with locking lugs 26 which are insertable into openings or slots 38.

In the same way as in the above embodiments a loose front wall 46 is applied to the front side of the load carrier, said front wall with its folded side edges 47 engaging the side walls of the box portion 11. At the lower part the front wall 46 is locked by pushing it into the load carrier 12, while the locking at the upper portion is made by means of the cover 48.

The invention is no limited to the described and shown embodiments but a number of modification are possible within the scope of the claims.

I claim:

1. A transport box of corrugated cardboard or the like, said box when erected being connectable with a load carrying plane, a pallet, a roller pallet or the like, at which the loading plane (12) is provided with connection means (15) designed to receive locking lugs (26) projectable or foldable from the bottom (21, 22) or lower part of the transport box (11), said locking lugs being arranged to connect the box to the loading plane, characterized in, that the locking lugs (26) comprise U-shaped cuts (25) arranged in connection to a folding line (24) between the side walls (18) and bottom flaps (21) of the transport box, said cuts being arranged to form outside the side walls projecting locking lugs (26) in the plane of the flaps (21) when these are folded to bear against the loading plane, and said locking lugs (26) being insertable under blocking surfaces (16) arranged at the connection means (15).

2. A transport box according to claim 1, characterized in, that the loading plane (12) comprises at least two raised connection means (15) arranged at at least two opposite side edges, preferably at all side edges and provided with blocking surfaces (16) located at a distance from the loading plane and facing this, said locking lugs (26) being insertable under said blocking surfaces.

3. A transport box according to claim 1, characterized in, that the loading plane (12) is trough-shaped and at its upper edge provided with a preferably all around extending edge portion (15) folded towards the bottom (13) of the trough, the free edge surface (16) of said edge portion (15) forming said blocking surface.

4. A transport box according to claims 1, 2 or 3, characterized in, that the bottom flaps (21, 22, 23) are lockable against erecting from the bottom (13) of the loading plane by means of at least one locking means (27, 28–30, 31).

5. A transport box according to claim 4, characterized in, that the bottom flaps (22, 23) of the rear wall and front wall portions are designed as locking lugs (27) at end edges facing each other, said locking lugs when said flaps are placed on the bottom flaps (21) of the side walls being insertable in the recesses of the side walls (18) formed by the cuts (25).

6. A transport box according to claim 5, characterized in, that in the bottom (13) of the loading plane there are arranged erected portions (28) or the like located just opposite the corresponding cuts (29) in the bottom flaps (21) of the side walls (18), said cuts (29) in upwards folded position forming support edges against the bottom flaps (23) of the front wall portion.

7. A transport box according to claim 6, characterized in, that the locking means comprises a plate (31) extending over substantially the entire bottom surface of the box and cooperating with the connection means (15).

8. A transport box according to claim 1, characterized in, that the box consists of a blank comprising two side walls (18), a rear wall (19), two narrow front wall portions (20) leaving a considerable part of the front wall open, a removable cover (48) and a removable front wall (46), which in its lower part is locatable by means of the connection means (15) and in its upper portion by means of the cover (48) and by bottom flaps (21, 22, 23) which are foldable into the box.

9. A transport box according to claim 8, characterized in, that the box (11) is stayed by at least one shelf plane (32), which by means of attachments (34) is connectable to the side walls (18) of the box.

* * * * *